Aug. 26, 1952     O. R. SCHOENROCK     2,608,041
CONVEYING MEANS FOR HARVESTER HEADERS
Filed Jan. 24, 1947     2 SHEETS—SHEET 1
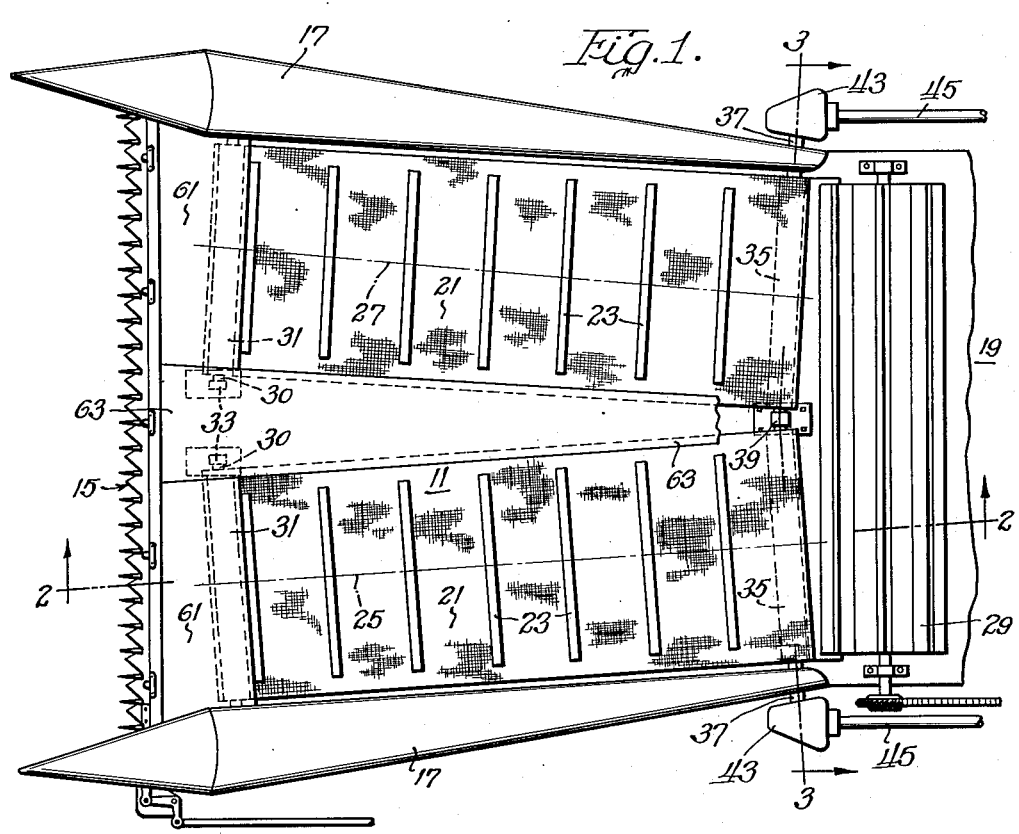
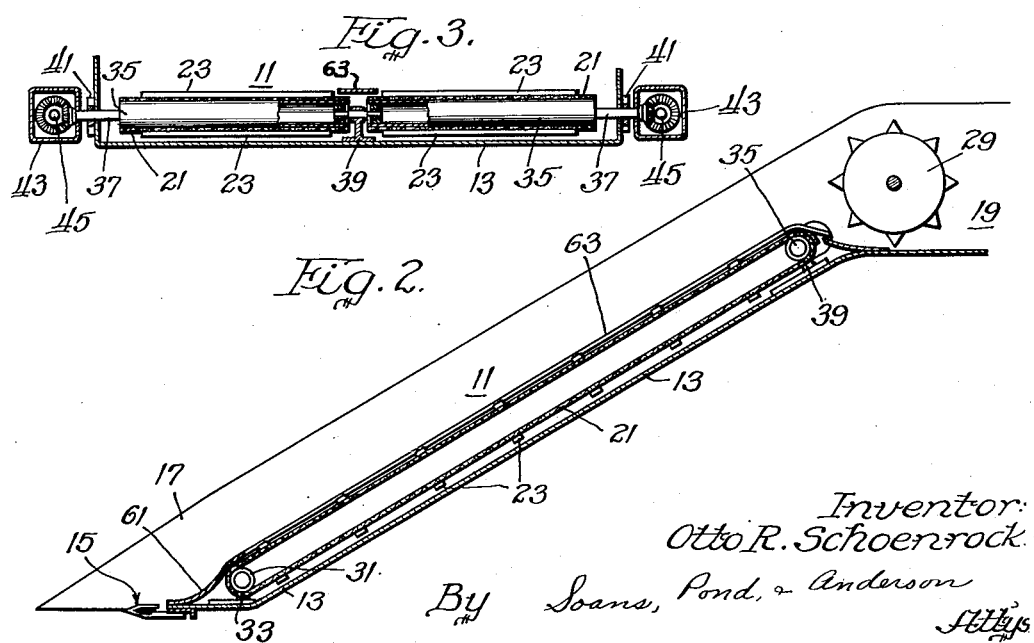
Inventor:
Otto R. Schoenrock
By Soans, Pond, & Anderson
Attys

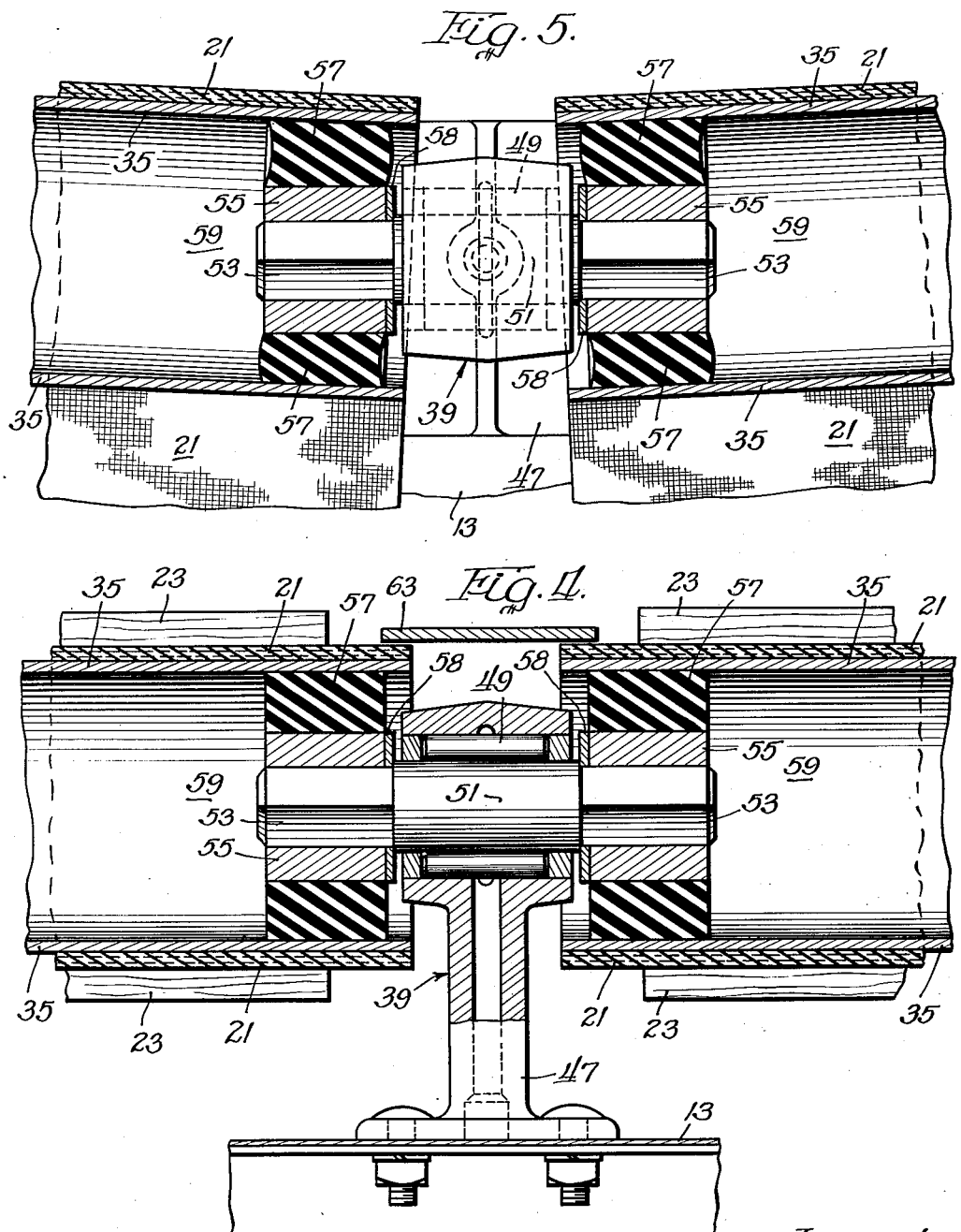

Patented Aug. 26, 1952

2,608,041

UNITED STATES PATENT OFFICE 2,608,041

CONVEYING MEANS FOR HARVESTER HEADERS

Otto R. Schoenrock, Racine, Wis., assignor to J. I. Case Company, Racine, Wis., a corporation of Wisconsin Application January 24, 1947, Serial No. 723,934

7 Claims. (Cl. 56—23)

The present invention relates generally to conveying headers such as are used in combines and other harvesting machines, and relates particularly to an improved belt type conveyor or "canvas" adapted for use as a part of the header of an in-line harvesting machine.

The header of the usual in-line harvesting machine comprises a cutter bar which is supported forwardly of and below the threshing or processing mechanism, an endless belt type conveyor extending between the cutter bar and the processing mechanism, the conveyor extending generally parallel to, or in-line with, the direction of movement of the implement, and various gathering reels and divider points designed to guide the crop material being cut into the conveyor. In order for the machine to operate efficiently, the crop is desirably cut in a wide swath which is then reduced in width for convenient feeding to the processing mechanism.

The usual conveyor heretofore utilized comprises an endless canvas belt provided with wood cross slats, although belts without slats have also been used. The cross slats are supposed to prevent loose grain kernels which have been knocked loose from the stalk during cutting, or from the vibration of the machine, from being lost by rolling down the belt back onto the field. However, during use of the cross slat belt conveyor, there is a tendency for the crop materials to spread across the entire width of the belt and for the grain to fall off the sides of the belt. In an attempt to overcome this difficulty, conveyor constructions having collapsing or folding slats, etc. have been tried, but all have been either unsuccessful in preventing the spreading of the crop material and the loss of grain or have been impractical due to their being extremely complicated.

The object of the present invention is to provide an improved conveyor of the class described which will be free from the deficiencies of the prior structures and which will converge the cut crop materials in the region of the center of the conveyor whereby losses of grain are reduced and the efficiency of subsequent processing units is increased. The above object is accomplished through novel structural combinations which will be apparent from the following description and the accompanying drawings of one preferred embodiment thereof.

In the drawings,

Fig. 1 is a fragmentary plan view of the header of a conventional in-line harvesting machine in which is utilized a converging conveyor embodying the features of the invention;

Fig. 2 is a sectional view taken on line 2—2 of Fig. 2;

Fig. 3 is a sectional view taken on line 3—3 of Fig. 2;

Fig. 4 is an enlarged side elevational view, partially in section of the improved bearing which is illustrated in section in Fig. 3 and which is an important feature of the invention; and Fig. 5 is a plan view, partially in section, of the bearing illustrated in Fig. 4.

The illustrated header embodies a dual belt, converging conveyor 11, in accordance with the invention, and includes a header frame having a pan structure 13 in which the conveyor belts move, a cutter bar 15 which is supported along the forward edge of the pan structure 13, and a pair of divider points 17 adapted to guide the grain onto the cutter bar 15 and to keep the standing grain free of the apparatus. The complete header is adapted to be supported upon and powered from the harvester 19 of which it is a part.

The converging conveyor 11 includes a pair of canvas or other suitable endless belts 21 to which are attached a plurality of spaced-apart cross slats 23 disposed normal to the direction of movement of the belts 21. The belts 21 lie in a common plane but their longitudinal axes 25 and 27 converge at an angle which allows the conveyor 11 to have a substantially greater width at the lower end, which is adjacent the cutter bar 15, than it has when it reaches its delivery point, which, in the illustrated structure, is adjacent the feed roll 29 of the harvester 19. Any material lying on the belt 21 which tends to fall back against the slats 23 will have its downward movement transformed into movement towards the center of the conveyor assembly 11 by the angled slats 23.

The conveyor belts 21 are supported at their lower ends upon belt rolls 31. Shafts 30 for the belt rolls 31 are journaled at their inner ends into standard pedestal bearings 33. The axes of the shafts 30 are not parallel but each is normal to the longitudinal axis of its respective conveyor belt. The outer ends of the supporting shafts 30 are journaled into fixed bearings (not shown) in the main frame or pan structure 13.

The conveyor belts 21 are supported at their upper ends by similar supporting rolls 35, arranged with their axes parallel to those of the lower rolls 31 so that the belts will run evenly thereon. The inner ends of the rolls 35 are journaled into a single or common pedestal bearing 39 which enables the rolls 35 and their conveyor belts 21 to be supported in close proximity to each other. This common bearing 39 constitutes an important feature of the invention and will be described more fully in a subsequent paragraph.

The outer ends of the rolls 35 are supported on stub shafts 37 which are journaled into suitable fixed bearings 41 attached to the frame structure or pan 13. The upper rolls 35 are adapted to be the driving rolls and in order to accomplish this, a bevel gear assembly 43 is used to connect the outer end of each shaft 37 to a shaft 45 which connects each gear assembly 43 with the harvester drive mechanism. By the provision of the novel common bearing 39, a single drive means geared to only one of the rolls may be used.

The common bearing member 39 (Figs. 4 and 5) includes a supporting pedestal 47, which is attached to the main frame 13, and a bearing insert 49. A stub shaft 51 having multi-sided extensions 53, is journaled into the bearing insert 49. The bearing insert 49 may be a sleeve type bearing, but it is preferably a ball or roller bearing as is illustrated. For mechanically connecting the inner ends of the rolls 35 to the stub shaft extensions 53, there is provided a resilient insert member which comprises an inner metallic sleeve 55 and an annular ring or sleeve of resilient material 57 which is integrally bonded to the periphery of the metallic sleeve. The resilient sleeve 57 may be constructed of rubber or one of the known rubber substitutes. The inner end of each of the rolls 35 is hollowed out to provide a cylindrical space 59 adapted to receive one of the resilient insert members, the dimension of the resilient sleeve 57 being such that the parts engage with a press fit. The metallic sleeve portion 55 of each of the resilient inserts is provided with a hole which corresponds in shape to the multi-sided shaft extension 55, and the parts are press-fitted or keyed together. It is desirable to provide protecting washers 58 to space the resilient sleeves 57 from the central bearing pedestal 47 and to thus prevent excessive wear on the resilient material 57.

Figure 5 shows particularly the manner in which the resilient sleeve 57 conforms to the space between the walls of the roll 35 and the shaft extension 51 upon which is attached its companion metallic sleeve 55 when the shaft is rotated with the axes set at an angle. It will be apparent that the metallic sleeve 55 can be eliminated if the shaft 51 and hollowed portion 59 of the roll 35 are properly proportioned, and such construction is intended to be within the scope of my invention.

As illustrated in Figures 1 and 2, transverse guide aprons 61 are provided on each side of the conveyor assembly 11 between the cutter bar 15 and the lower portion of the conveyor belts 21. These transverse aprons 61 may be fabricated from a suitable sheet material and are supported upon the main frame or pan 13. A longitudinally extending apron 63, having a tapered outline which conforms with the space between the converging belts 21, is disposed in close proximity to the surfaces of the belts. This apron 63 may be made of any suitable smooth sheet material and is supported upon the main frame 13; it overlies the edges of the belts 21 and closes the tapered opening therebetween.

During operation my improved conveyor effectively moves the cut crop material inwardly by utilizing the inward components of force that are obtained when the grain or other materials come in contact with the angled cross slats. In a working embodiment of the invention, it was found that the optimum angle of convergence depended upon the steepness of the conveyor. The steeper the conveyor, the smaller the angle of convergence that could be used to gather the material towards the center.

It has been found that any loose grain which falls upon the central apron is not lost as has heretofore been the case in a multiple belt arrangement. Instead, the concentration of matted stalks at the center tends to continuously sweep the central apron and carry the grain kernels upward. The provision of the single common bearing between the upper conveyor belt supporting rolls allows the rolls to run freely and permits the belts to be run within close proximity of one another providing more efficient conveying operation.

The features of the invention that are believed to be new are expressly set forth in the appended claims.

I claim:

1. In a conveyor adapted for use with apparatus of the class described, an inclined, endless, belt type conveyor assembly, including a pair of cooperating conveyor belts which are disposed in a common plane, which are rather widely separated at the lower end of the assembly, and which converge to substantially the width of the pair of cooperating belts at the upper end, and a relatively flat, generally rigid, longitudinally extending apron bridging the space between said converging belts, said apron overlying the adjacent edges of said belts, whereby material on said apron is swept upwardly by crop material on said conveyor.

2. In a header for harvesting apparatus of the class described, a frame, a cutter bar supported on said frame, means for operating said cutter bar, an inclined, endless, belt type conveyor assembly, supported on said header frame, said assembly including a pair of cooperating conveyor belts each of which comprises a fabric belt upon which is supported a plurality of transversely extending, spaced-apart slats, said conveyor belts being disposed in a common plane, being spaced apart at the lower end of the assembly, and converging to substantially the width of the two belts at the upper end, each belt being supported upon a roll at the lower end thereof and each of said rolls being journaled into suitable bearings for free, rotatable movement, and a pair of rolls at the upper end of the conveyor adapted to support the upper ends of said belts, said upper rolls being supported by a single bearing structure at their inner ends, and to separate fixed bearings at their outer ends, said bearing structure including a support, a bearing portion connected to said support, and a stub shaft which is journalled in said bearing portion and extends from both ends of said portion, there being an annular ring of resilient material disposed about each of the extending ends of said stub shaft which engages and supports the inner ends of said upper rolls, means for rotating said rolls, transversely extending aprons intermediate said cutter bar and the lower end of said belt conveyors, a longitudinally extending apron disposed between said belts, and a pair of divider points which extend longitudinally of said header for the full run of said conveyor belts, said divider points being disposed adjacent to and following the contour of the outer periphery of said belts, whereby material mowed by said cutter bar is conveyed upward by said belt conveyor assembly and is converged towards the inner edges of said belts.

3. In a header for harvesting apparatus of the class described, a frame, a cutter bar supported on said frame, means for operating said cutter bar, an inclined, endless, belt-type conveyor assembly supported on said header frame, said assembly including a pair of cooperating belts upon which there is supported a plurality of spaced transversely extending slats, said conveyor belts being disposed in a common plane, being spaced apart at the lower end of the assembly, and converging to substantially the width of the two belts at the upper end, each belt being supported upon a roll at the lower end thereof said rolls being journalled into suitable bearings for free, rotatable movement, and a second roll at the upper end of each of said belts for supporting said belts, said second rolls being supported by a single bearing structure at the inner ends thereof, the outer end of each of said rolls being supported by a fixed bearing, said single bearing structure including a support, a bearing portion connected to said support, a stub shaft, which is journalled in said bearing portion and which extends from both ends of said portion, an annular ring of resilient material disposed about each of the ends of said stub shaft, said ring of resilient material engaging and supporting the inner ends of said upper rolls, means for rotating said rolls, transversely extending aprons intermediate said cutter bar and the lower end of said conveyors, a flat, generally rigid, longitudinally extending apron supported on said frame so as to bridge the space between said converging belts, said apron being generally T shaped in cross section in order to cover the inner edges of said conveyor belts and having its forward end connected to and merging with said transversely extending aprons, and a pair of divider points which extend longitudinally of said header for the full run of said conveyor belts, said divider points being disposed adjacent to and following the contour of the outer periphery of said belts, said divider points coacting with said apron and said conveyor belts to cause material mowed by said cutter bar to be conveyed upward by said belt conveyor assembly and to be converged towards the inner edges of said belts.

4. In a header for harvesting apparatus of the class described, a frame, a cutter bar supported on said frame, means for operating said cutter bar, an inclined, endless, belt-type conveyor assembly supported on said header frame, said assembly including a pair of cooperating belts which are disposed in a common plane, which are spaced apart at the lower end of the assembly, and which converge to substantially the width of the two belts at the upper end, each belt being supported upon a roll at the lower end thereof and said rolls being journalled into suitable bearings for free, rotatable movement, and a second belt supporting roll at the upper end of each of the belts, said second rolls being supported by a single bearing structure at the inner ends thereof and by two separate, fixed bearings at the outer ends thereof, said bearing structure including a support, a bearing portion connected to said support, a stub shaft, which is journalled in said bearing portion and which extends from both ends of said portion, and an annular ring of resilient material disposed about each of the extending ends of said stub shaft, said rings of resilient material being engaged with the inner ends of said second belt supporting rolls to provide support therefor, means for rotating said rolls, transversely extending aprons intermediate said cutter bar and the lower end of said conveyors, and a flat, generally rigid, longitudinally extending apron supported on said frame so as to bridge the space between said converging conveyor belts, said apron being generally T shaped in cross section in order to cover the inner edges of said conveyor belts and having its forward end connected to and merging with said transversely extending aprons, said longitudinally extending apron coacting with said transversely extending apron and said conveyor belts to cause material mowed by said cutter bar to be conveyed upward by said belts to be converged towards the inner edges of said belts.

5. In a conveyor adapted for use with apparatus of the class described, an inclined, endless belt-type conveyor assembly which includes a pair of cooperating conveyor belts which are disposed in a common plane, each belt being supported on a pair of spaced-apart rolls, one of said pair of spaced-apart rolls being disposed at the upper end of its associated conveyor belt, and the other of said spaced-apart rolls being disposed at the lower end of its associated conveyor belt, the supporting rolls at the lower end of said conveyor belts being rather widely separated, the supporting rolls for the upper ends of said conveyor belts being disposed closely adjacent one another, a relatively flat, generally rigid, longitudinally extending apron bridging the space between said converging belts, said apron overlying the adjacent edges of said belts, whereby material on said apron is swept upwardly by crop material on said conveyor, and means for supporting said rolls including a single bearing structure disposed between the adjacent ends of the support rolls at the upper ends of said conveyor belts.

6. In a gathering type header for a combination harvester thresher, said header having an upwardly inclined frame, a crop receiving element at the upper end of the frame, belt conveying means carried on the frame, gathering points spaced-apart at the lower end of the frame a distance greater than the width of said crop receiving element, and actuating means for the conveying means, improvement which consists in providing a conveying means embodying a plurality of adjacent, belt-type conveyors which are arranged in a common plane in edge-to-edge relation, which are disposed closely together at the upper ends thereof, and which are spaced-apart at the lower ends thereof to an extent substantially equivalent to the difference between the spacing of the gathering points and the width of the crop receiving element, said gathering points being arranged to extend along the outer sides of the belt conveyors, contiguous with the edges thereof, and means defining a plane surfaced apron disposed to occupy the tapered space between the inner edges of the belt conveyors.

7. In a gathering type header for a combination harvester-thresher, said header having an upwardly inclined frame, a cutter bar at the lower end of the frame, a crop receiving element which is narrower than the length of said cutter bar, said crop receiving element being disposed at the upper end of said frame, gathering points at the sides of the frame, and actuating means for the cutter bar and conveying means, the improvement which comprises providing a conveyor having a plurality of adjacent, endless-belt-type conveyors which are arranged in a common plane in edge-to-edge relation, which are disposed close together at the upper ends thereof, and which are spaced-apart at the lower ends thereof to an extent substantially equivalent to the difference between the length of the cutter bar and the length of the crop receiving element, said gathering points being arranged to extend along the outer sides of the belt conveyors, contiguous with the edges thereof, and a plane surfaced apron means disposed intermediate said belt conveyors to occupy the tapered space therebetween.

OTTO R. SCHOENROCK.

REFERENCES CITED

The following references are of record in the file of this patent:

UNITED STATES PATENTS

| Number | Name | Date |
|---|---|---|
| 1,253,601 | Jones | Jan. 15, 1918 |
| 1,309,689 | Jory | July 15, 1919 |
| 1,879,232 | Henry | Sept. 27, 1932 |
| 1,900,563 | Keller | Mar. 7, 1933 |
| 1,928,868 | Poen | Oct. 3, 1933 |
| 1,972,407 | Morse | Sept. 4, 1934 |
| 2,090,598 | Parsons | Aug. 17, 1937 |
| 2,142,784 | Guy | Jan. 3, 1939 |
| 2,169,625 | Weiss et al. | Aug. 15, 1939 |
| 2,386,881 | Phillips | Oct. 16, 1945 |